United States Patent
Capelli et al.

(10) Patent No.: US 12,104,945 B2
(45) Date of Patent: Oct. 1, 2024

(54) CONDITION MONITORING IN A PACKAGING MACHINE FOR LIQUID FOOD

(71) Applicant: Tetra Laval Holdings & Finance S.A., Pully (CH)

(72) Inventors: Luca Capelli, Novellara (IT); Davide Borghi, Modena (IT); Marco Cocconcelli, Reggio Emilia (IT); Giulia Massaccesi, Civita Castellana (IT); Raffaele Di Canosa, Modena (IT); Jacopo Cavalaglio Camargo Molano, Solomeo di Corciano (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 315 days.

(21) Appl. No.: 17/634,368

(22) PCT Filed: Jul. 6, 2020

(86) PCT No.: PCT/EP2020/068951
§ 371 (c)(1),
(2) Date: Feb. 10, 2022

(87) PCT Pub. No.: WO2021/028117
PCT Pub. Date: Feb. 18, 2021

(65) Prior Publication Data
US 2022/0326067 A1 Oct. 13, 2022

(30) Foreign Application Priority Data
Aug. 13, 2019 (EP) .................... 19191369

(51) Int. Cl.
*G01H 1/00* (2006.01)
*B65B 3/02* (2006.01)

(52) U.S. Cl.
CPC .................... *G01H 1/00* (2013.01); *B65B 3/02* (2013.01)

(58) Field of Classification Search
CPC ............ G01H 1/00; G01H 1/16; G01H 17/00; G01H 1/006; G01M 15/12; G01M 99/00;
(Continued)

(56) References Cited

U.S. PATENT DOCUMENTS

| 6,591,682 B1 | 7/2003 | Lysen |
| 2010/0253512 A1* | 10/2010 | Wagner .............. G05B 23/0229 340/540 |

(Continued)

FOREIGN PATENT DOCUMENTS

| CN | 102822644 A | 12/2012 |
| CN | 103547511 A | 1/2014 |

(Continued)

OTHER PUBLICATIONS

Office Action in Chinese Application No. 202080051369.9 dated Nov. 25, 2023.
(Continued)

*Primary Examiner* — Daniel R Miller
*Assistant Examiner* — Matthew W. Baca
(74) *Attorney, Agent, or Firm* — Knobbe, Martens, Olson & Bear, LLP

(57) ABSTRACT

A monitoring device for condition assessment of a packaging machine for producing packages of liquid food comprises a signal interface for connection to a plurality of vibration sensors in the packaging machine. The monitoring device includes logic to: receive measurement signals from the vibration sensors and obtain an event timing signal, MES, indicative of predefined work events of the packaging machine, wherein the respective work event corresponds to a mechanical action by a respective component in the packaging machine when operating to produce the packages. The monitoring device further includes logic to: identify, by use of the MES and in the measurement signals, signal
(Continued)

values associated with the respective component, and evaluate the signal values for condition assessment of the respective component. The provision and use of the MES thus facilitates condition assessment of individual components in a packaging machine.

20 Claims, 4 Drawing Sheets

(58) Field of Classification Search
CPC ............. G01M 13/028; G01M 13/045; G01M 99/005; B65B 3/02; B65B 9/20; B65B 57/00; B65B 57/18; B65B 3/04; B65B 25/001; B65B 41/12; B65B 51/26; B65B 55/103; B65B 61/06; G05B 23/0208; G05B 23/0218; G05B 23/0221; G05B 23/0235; G05B 23/0237; G05B 23/0243; G05B 23/0251; G05B 23/0275; G05B 23/024; G05B 23/0229; G05B 2219/35499; G05B 2219/23456; G05B 2219/37435; G05B 2219/37434; G05B 2219/37351; G05B 2219/37456; G05B 2219/34202; G05B 2219/42157; G05B 2219/37458; G05B 2219/37459; G01N 29/44; G01N 29/4409; G01N 29/4418; G01N 29/4427; G01N 29/4436; G01N 29/4454; G01N 29/4472; G03F 7/709
See application file for complete search history.

(56) References Cited

U.S. PATENT DOCUMENTS

| | | | |
|---|---|---|---|
| 2011/0137631 A1* | 6/2011 | Komatsu | G05B 19/4063 703/6 |
| 2013/0106612 A1 | 5/2013 | Licher | |
| 2020/0133230 A1* | 4/2020 | Goto | G05B 19/4065 |
| 2021/0055708 A1* | 2/2021 | Handa | G05B 19/4065 |
| 2022/0390271 A1* | 12/2022 | Fukuda | G01M 13/028 |

FOREIGN PATENT DOCUMENTS

| | | |
|---|---|---|
| CN | 105917207 A | 8/2016 |
| CN | 106 995 007 | 8/2017 |
| CN | 107003663 A | 8/2017 |
| CN | 108496123 A | 9/2018 |
| CN | 108733010 A | 11/2018 |
| CN | 109074683 A | 12/2018 |
| CN | 109153469 A | 1/2019 |
| CN | 109923052 A | 6/2019 |
| EP | 3 254 979 | 12/2017 |
| JP | H04-42024 A | 2/1992 |
| JP | H08-217028 A | 8/1996 |
| JP | 2018177268 A | 11/2018 |
| WO | WO 2018/228755 | 12/2018 |

OTHER PUBLICATIONS

International Search Report issued in PCT/EP2020/068951 mailed on Sep. 14, 2020.

* cited by examiner

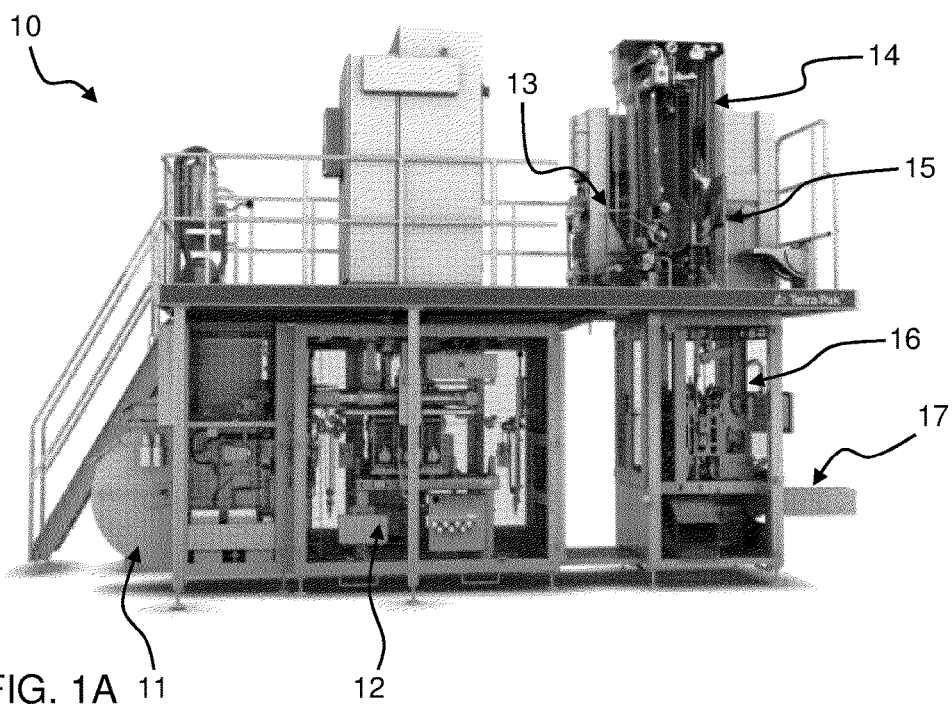
FIG. 1A
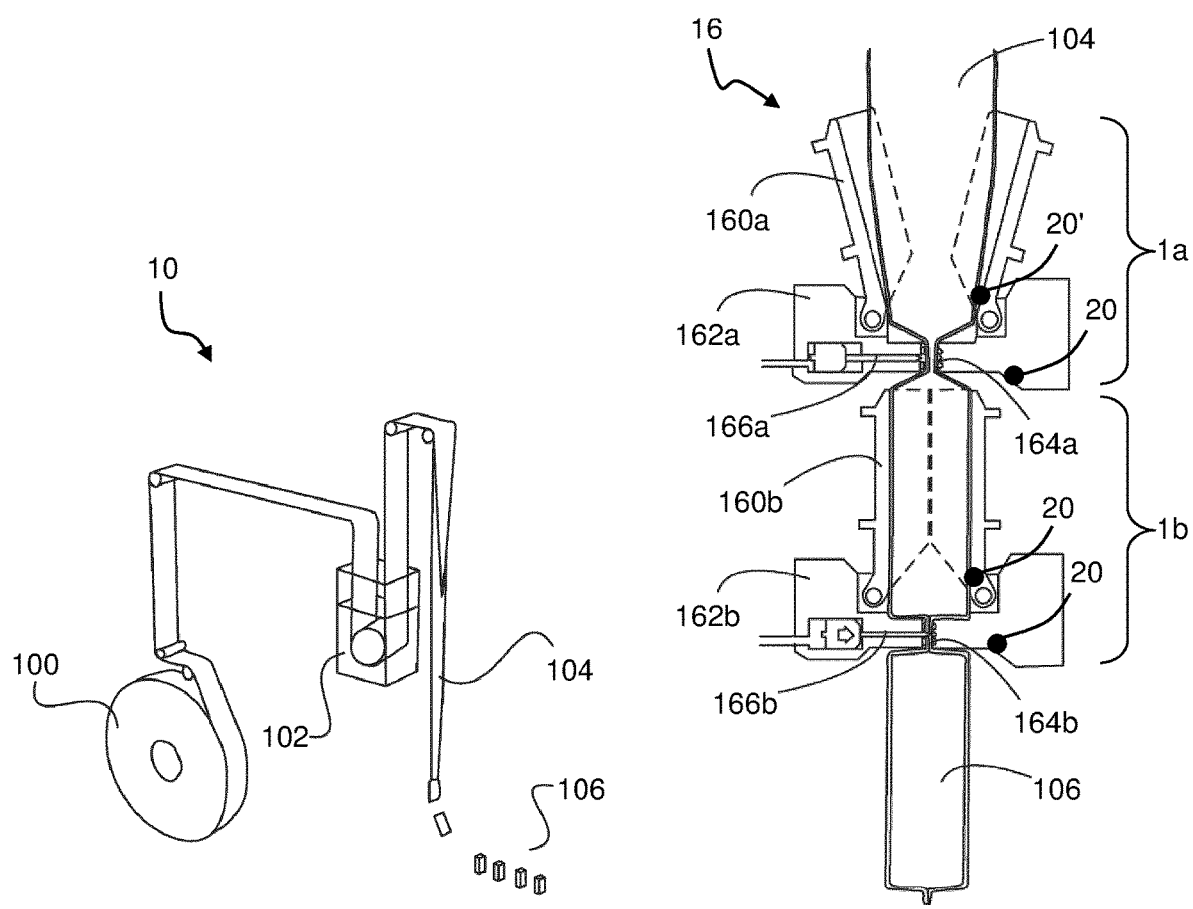
FIG. 1B
FIG. 1C

CONDITION MONITORING IN A PACKAGING MACHINE FOR LIQUID FOOD

TECHNICAL FIELD

The present disclosure generally relates to techniques for condition monitoring of a packaging machine which is configured and operated for production of packages of liquid food, and in particular condition monitoring based on measurement signals from a plurality of vibration sensors in the packaging machine.

BACKGROUND ART

Industrial production and packaging of liquid food is automated and involves advanced process control of food packaging machines to achieve high-volume production. Safe and reliable operation of the food packaging machines is of great significance since operational failures and ensuing production standstills may have a profound impact on production cost and product quality. Early detection of operational failures is critical in avoiding performance degradation and damage to the machinery or human life. There is thus a general need for accurate condition monitoring of food packaging machines to help operators take the right decisions on emergency actions and preventive service and repair.

Due to the inherent mechanical complexity of food packaging machines, the task of performing condition monitoring is quite difficult. Attempts have been made to perform frequency or time-frequency analysis of vibration data from sensors in a food packaging machine to detect abrupt and incipient fault conditions. Each sensor tends to pick up vibrations from a plurality of different mechanical components in the packaging machine, which causes the resulting vibration data to contain an intricate mixture of vibrations generated within the food packaging machine. While frequency or time-frequency analysis of vibration data from the sensors may serve to indicate presence of an abrupt or incipient fault condition in the packaging machine as a whole, the analysis is generally unable to reveal which one of the typically hundreds of components in the packaging machine that needs servicing. In other words, existing techniques for condition monitoring in food packaging machines lack in specificity with respect to the origin or cause of a current or developing fault condition.

SUMMARY

It is an objective to at least partly overcome one or more limitations of the prior art.

One objective is to provide a technique for condition monitoring with improved specificity in machines for production of packages of liquid food.

A further objective is to provide such a technique that is simple, efficient and robust.

One or more of these objectives, as well as further objectives that may appear from the description below, are at least partly achieved by a method of monitoring a packaging machine, a computer-readable medium, and a monitoring device according to the independent claims, embodiments thereof being defined by the dependent claims.

A first aspect of the present disclosure is a method of monitoring a packaging machine which is operating to produce packages of liquid food. The method comprises: receiving measurement signals from a plurality of vibration sensors in the packaging machine; and obtaining an event timing signal indicative of predefined work events of the packaging machine, wherein a respective predefined work event among the predefined work events corresponds to a mechanical action by a respective component in the packaging machine when operating to produce the packages. The method further comprises: identifying, by use of the event timing signal and in the measurement signals, signal values associated with the respective component; and evaluating the signal values for condition assessment of the respective component.

The first aspect is based on the insight that the specificity of condition monitoring may be improved by access to an event timing signal that indicates the mechanical actions that are performed by the packaging machine during operation and designates the machine components that are involved in the respective mechanical action. The event timing signal may thereby be used as a reference to identify, in the measurement signals, signal values which are specific to an individual machine component and which thus enable a condition assessment to be made for individual machine components in the packaging machine. When the event timing signal is available, the identification of signal values may ensue through a simple, efficient and robust time-domain matching of the respective measurement signal to the event timing signal.

A second aspect of the present disclosure is a computer-readable medium comprising computer instructions which, when executed by a processor, cause the processor to perform the method of the first aspect or any embodiment thereof.

A third aspect of the present disclosure is a monitoring device, comprising a signal interface for connection to a plurality of vibration sensors in a packaging machine, and logic configured to control the monitoring device to perform the method of the first aspect or any embodiment thereof.

Still other objectives, as well as embodiments, features, aspects and advantages of the invention will appear from the following detailed description as well as from the drawings.

BRIEF DESCRIPTION OF THE DRAWINGS

Embodiments will now be described, by way of example, with reference to the accompanying schematic drawings.

FIG. 1A is a side view of a roll-fed carton packaging machine in accordance with an example, FIG. 1B illustrates in perspective view a flow of material through the packaging machine of FIG. 1A, and FIG. 10 is a side view of a mechanism for transversal sealing in the packaging machine of FIG. 1A.

DETAILED DESCRIPTION

Figure 2A:
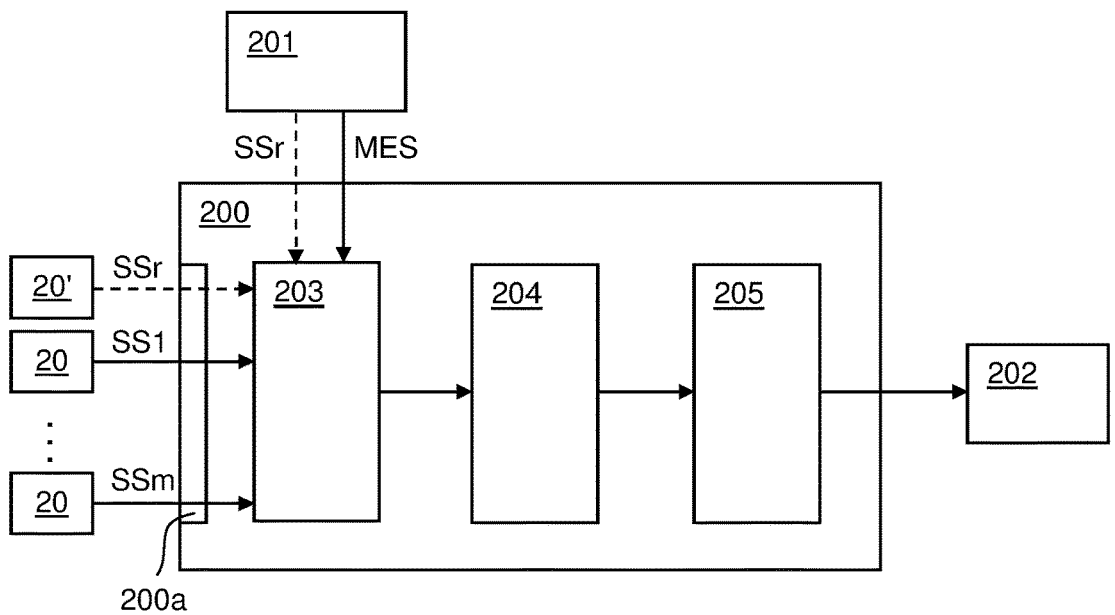
FIGS. 2A-2B are block diagrams of a monitoring device for condition assessment of a packaging machine in accordance with some embodiments.

Embodiments will now be described more fully hereinafter with reference to the accompanying drawings, in which some, but not all, embodiments are shown. Indeed, the invention may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. As used herein, the term "and/or" comprises any and all combinations of one or more of the associated listed items.

As used herein, "liquid food" refers to any food product that is non-solid, semi-liquid or pourable at room temperature, including beverages, such as fruit juices, wines, beers, sodas, as well as dairy products, sauces, oils, creams, custards, soups, pastes, etc, and also solid food products in a liquid, such as beans, fruits, tomatoes, stews, etc.

As used herein, "a package" refers to any package or container suitable for sealed containment of liquid food products, including but not limited to containers formed of cardboard or packaging laminate, e.g. cellulose-based material, and containers made of or comprising plastic material.

Like reference signs refer to like elements throughout.

FIG. 1A is a side view of a machine 10 for packaging of liquid food. The machine 10 is an example of a roll-fed carton based packaging system. In the illustrated example, the machine 10 comprises an in-feed section 11, which holds one or more reels of carton-based sheet material, a micro injection molding section 12 for application of a molded opening device to the sheet material, a bath section 13 for sterilizing the sheet material, a sterile chamber 14, a tube forming section 15 for forming the sheet material into a tube, a filling section 16 for filling, sealing and cutting the tube-shaped material, and an outfeed section 17 for outputting packages.

FIG. 1B generally illustrates an operating principle of the machine 10 in FIG. 1A, which may be deployed for continuous packaging of liquid food products. Packaging material is delivered in reels 100 of sheet material to the plant where the packaging machine is installed. The machine 10 unwinds and feeds the packaging material into a bath 102, e.g. containing hydrogen peroxide, in order to sterilize the packaging material. Alternatively, the sterilization may be performed by use of low-voltage electron beam (LVEB) technology. After sterilization, the packaging material is formed into a tube 104. More particularly, longitudinal ends are attached to each other continuously in a process often referred to as longitudinal sealing. When having formed the tube 104, the machine fills it with a liquid food product. The machine forms packages 106 from the food-containing tube 104 by making transversal seals in an end of the tube 104 and cutting off sealed portions as they are formed. The machine may perform different shaping operations during and/or after the transversal sealing in order to shape the packages 106.

There are a number of critical processes run in parallel in the roll-fed packaging system that may cause quality issues in the produced packages if for example these processes are not properly tuned or if there are machine parts that have been worn out. One critical process in the machine 10 is the filling section 16, which is illustrated in more detail in FIG. 10 by way of example. In order to produce the packages 106 from the tube 104, forming flaps 160a, 160b in combination with sealing jaws 162a, 162b may be used. Each sealing jaw 162a, 162b comprises a sealing device 164a, 164b and a knife 166a, 166b, or other cutting element, for separating a formed package from the tube 104. Each combination of a forming flap 160a, 160b and a sealing jaw 162a, 162b defines a respective mechanical unit 1a, 1b, which is moved along with the tube, e.g. driven by a chain mechanism (not shown). FIG. 10 illustrates a first and a second stage of the package-forming process. In the first stage, the forming flaps 160a are starting to form the tube into a shape of the package and the tube is filled with the liquid food product, e.g. via a pipe (not shown) extending into the tube. Also in the first stage, the sealing jaws 162a are operated to form a transversal seal by use of the sealing device 164a. In the second stage, the forming flaps 160b are held in position such that the package shape is formed. Also in the second stage, the sealing jaws 162b are operated to form a transversal seal using the sealing device 164b. When the transversal seal is completed, the knife 166b is operated to cut off a lower part of the tube 104, in which both ends are closed by transversal seals.

The machine 10 in FIGS. 1A-1C is merely given as an example of a packaging machine. Another well-known type of packaging machine implements a so-called blanks-fed packaging system, in which pieces of packaging material ("blanks") with two ends welded together to form a folded sleeve are fed to the packaging machine, erected into an open sleeve, folded and sealed such that bottoms are formed, filled with liquid food product, and sealed and folded to form a package.

In the following, embodiments of a technique for condition monitoring in a packaging machine will be described with reference to the machine 10 in FIGS. 1A-1C. However, the technique for condition monitoring may be applied to any machine deployed in a production line for packaging of liquid food products, including but not limited to machines for feeding and/or manipulating a packaging material, filling machines with any type of packaging system, capping machines, accumulator machines, straw application machines, secondary packaging machines, etc.

The condition monitoring operates on sensor signals ("measurement signals") from a plurality of vibration sensors 20 that are attached, integrated or otherwise included in the machine 10 to be monitored, e.g. as shown in FIG. 10. The vibration sensor may be of any type capable of generating an output signal indicative of vibrations. As used herein, a "vibration" refers to any quivering or trembling motion of a mechanical component in the machine 10. Non-limiting examples of vibration sensors 20 include accelerometers, orientation sensors, position sensors, force sensors, and microphones. Further, a torque sensor arranged to measure torque in a rotating system, e.g. in a drive mechanism for a moving component of the machine 10, may be used as a vibration sensor.

When operative to produce packages, the machine 10 is a highly dynamical system with many moving parts and significant mechanical interaction, both between moving parts and between moving and stationary parts. If one or more mechanical components in the machine 10 starts to malfunction, the vibrations detected by the sensors 20 are likely to change, which may be detected by analysis of the sensor signals in the time and/or frequency domain. However, it should be understood that the respective vibration sensor 20 is likely to pick up vibrations of many different origins in its surroundings. It is thus difficult to identify, based on the sensor signals from the vibration sensors 20, the specific mechanical component that needs to be replaced. Thus, the effectiveness of service and maintenance is highly reliant on the experience of the operator, and there is a significant risk of lengthy standstills in production. Embodiments of the invention seek to mitigate this problem.

FIG. 2A illustrates a monitoring device 200 for performing condition monitoring in accordance with some embodiments. The monitoring device 200 comprises a signal interface 200a which is configured for connection, by wire or wirelessly, to the vibration sensors 20. In the illustrated example, the monitoring device 200 receives sensor signals SS1-SSm from m vibration sensors via the signal interface 200a. The vibration sensors 20 may be arranged in a single packaging machine, e.g. the machine 10 in FIGS. 1A-1C, or in plural packaging machines within a plant. The monitoring device 200 is configured to process the sensor signals SS1-SSm in view of a modeled event signal, MES, which is obtained from a memory device 201, to produce an output signal for a feedback device 202. The output signal may indicate a specific mechanical component that needs to be replaced and possibly an estimated remaining useful life (RUL) of the component. The feedback device 202 may, e.g., comprise one or more of a display, a touch screen, an indicator lamp, and a loudspeaker. The monitoring device 20 may be further connected to a control device (not shown) of the machine 10 and operable to command an emergency stop when an acute fault condition is detected.

The modeled event signal, MES, is a predefined or pre-computed signal that indicates the timing of predefined work events in the machine 10 during production of the packages 106. Each work event corresponds to a mechanical action by a respective component in the operating machine 10. Thus, the MES is an event timing signal that is specific to the machine 10 and to the operational setting of the machine 10. The MES may be seen to associate a time point with the respective work event. If the machine 10 operates in a repeating production cycle, e.g. to produce one or a sequence of packages 106, the MES may represent the relative timing of work events performed by the machine during one production cycle. In one embodiment, the MES is computed by simulation, by use of a mathematical model that represents the machine 10 and its operation, in particular the mechanical actions performed by the machine 10 during production of the packages 106. In another embodiment, the MES is at least partly determined based on measurements in a corresponding reference machine, which may be equipped with specialized sensors for isolated detection of work events.

Figure 4A:
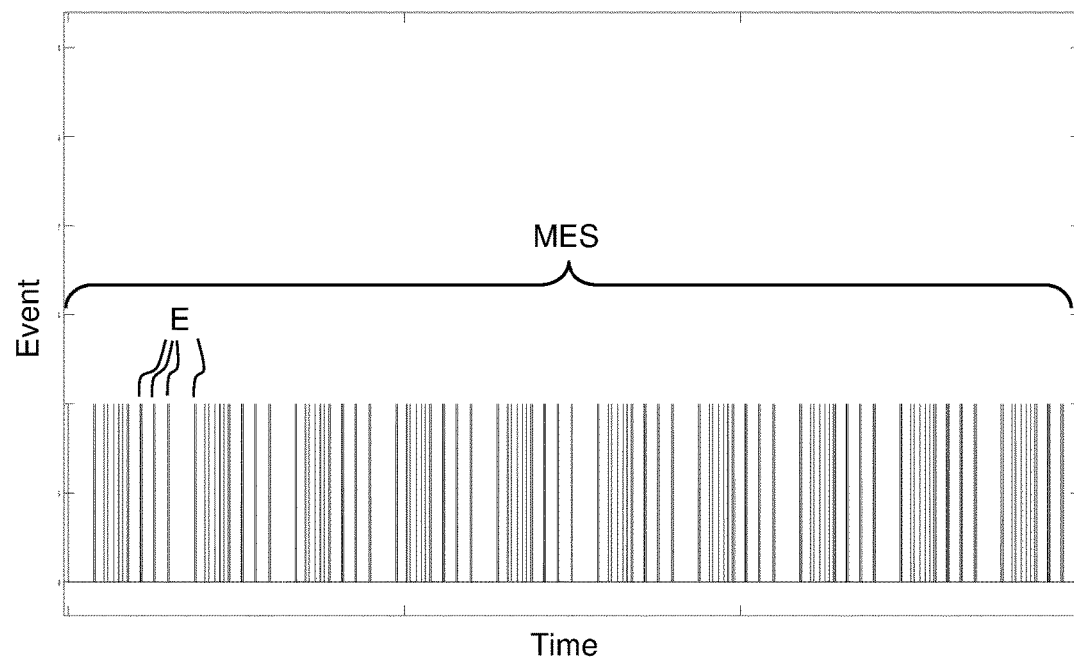
FIG. 4A is a graph of a model event signal representing a time-sequence of mechanical events in a packaging machine.

An example of the MES is shown in FIG. 4A, where each vertical line represents a work event in the machine 10. In the illustrated example, the MES thus comprises a sequence of event indicators or flags E and the relative timing of the work events is given by the location of the event indicators E in the MES. Each event indicator E in the MES may correspond to a mechanical action that generates a vibration that is detected by one or more of the sensors 20 in the machine 10 and thus results in a response in at least one of the sensor signals SS1-SSm. However, it is conceivable that some event indicators E do not necessarily result in such a response.

Figure 4B:
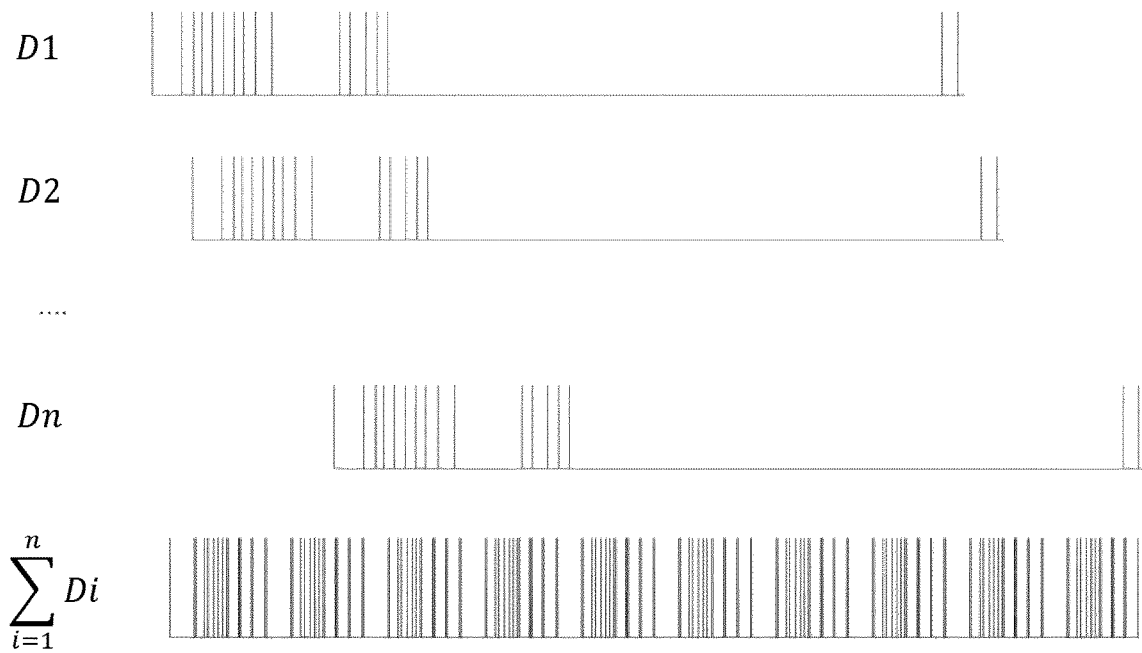
FIG. 4B illustrates groups of events originating from different mechanical components in the packaging machine.

In the MES, groups of events are associated with different mechanical components of the machine 10. This is illustrated in FIG. 4B, which shows groups of events associated with n different components D1-Dn in the machine 10. In the example of FIG. 10, one or more of the components D1-Dn may correspond to one or more of the flaps 160a, 160b, one or more of the sealing jaws 162a, 162b, one or more of the knifes 166a, 166b, or a drive element for the respective mechanical unit 1a, 1b, or any combination thereof.

As seen at the bottom of FIG. 4B, the sum of the groups of events for the different components D1-Dn results in the MES. The association of groups of events to components D1-Dn is also predefined and known from the MES. It is conceivable that a component is associated with a single event and, thus, a group of events may include one or more events.

One aspect of the present disclosure relates to a method of monitoring a packaging machine. This monitoring method will now be exemplified with reference to the flow chart in FIG. 3 and the exemplifying monitoring device 200 in FIG. 2A in relation to the machine 10 in FIGS. 1A-1C. The illustrated monitoring method 300 comprises a step 301 of obtaining the MES, which has been pre-computed and stored in a memory, e.g. the memory device 201 (FIG. 2A). As explained above, the MES is indicative of predefined work events of the machine 10, and the respective predefined work event corresponds to a mechanical action by a respective component D1-Dn in the machine 10 when operative. Step 302 receives the sensor signals SS1-SSm from the vibration sensors 20. In one implementation, step 302 may acquire the sensor signals SS1-SSm for a predefined time period, e.g. corresponding to the above-mentioned production cycle, before providing them for processing by subsequent steps. In another implementation, step 302 may continuously receive signal values from the vibration sensors SS1-SSm and provide the signal values in near real time for processing by subsequent steps.

Step 303 identifies, by use of the MES, signal values associated with the respective component D1-Dn in the machine 10. Thus, in step 303, the MES is used as a reference for identifying, in the sensor signals SS1-SSm, the signal values that represent the operation of the respective component D1-Dn. It is realized that the time frames of the MES and the respective sensor signal SS1-SSm need to be synchronized in order for the MES to be used as a reference.

Figure 3:
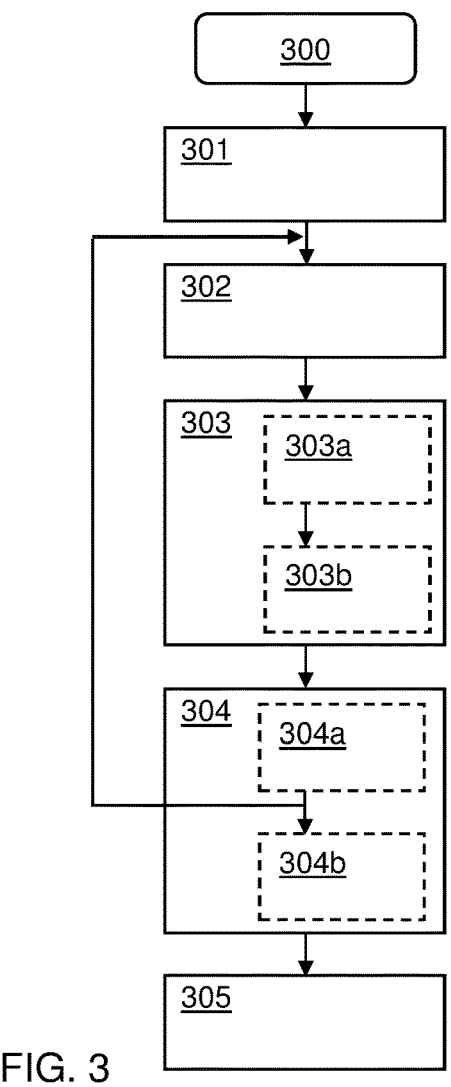
FIG. 3 is a flowchart of a method for condition assessment of a packaging machine in accordance with some embodiments.

In one embodiment, depicted in FIG. 3, step 303 may comprise a sub-step 303a of matching time points in the sensor signals SS1-SSm to time points in the MES. In some embodiments, this time-domain matching is performed by use of a reference signal SSr, which is a real-time signal generated by a reference sensor 20' in the machine 10, as indicated in FIG. 10 and FIG. 2A. The reference sensor 20' may be a position sensor or any other type of sensor that is arranged to signal a specific mechanical action that is included as an event in the MES. The reference signal SSr is thus generated concurrently with the sensor signals SS1-SSm and is indicative of a predefined time point in the MES. In one such embodiment, step 303a compares the reference signal SSr to the sensor signals SS1-SSm to allocate the predefined time point in the sensor signals SS1-SSm, which are thereby synchronized with the MES. In some embodiments, the time-domain matching is instead performed by use of a predefined reference signal SSr, which may be retrieved from a memory, e.g. the memory device 201 (FIG. 2A). The predefined reference signal SSr may correspond to one of the sensor signals SS1-SSm and is matched to the MES, so that there is a known temporal correspondence between time points in SSr and MES. The predefined reference signal SSr may have been generated from one of more sensor signals produced by vibration sensor(s) in a reference machine, which is substantially identical to the machine 10. In one such embodiment, sub-step 303a may correlate the predefined reference signal SSr with the corresponding sensor signal, e.g. to identify the best match between the signals. By this correlation, since the reference signal SSr has a known temporal correspondence to the MES, the time points in the sensor signals SS1-SSm are matched to the time points in the MES. One technical advantage of using a predefined reference signal SSr is that the monitoring method 300 may be implemented on machines 10 that lack a reference sensor 20'. A drawback is that one reference signal SSr needs to be predefined for each setting of the machine 10. This drawback is obviated by the use of a reference sensor 20', which thus improves versatility and possibly accuracy.

As depicted in FIG. 3, step 303 may comprise a further sub-step 303b which uses the known association between groups of events and components D1-Dn, as exemplified in FIG. 4B. In one embodiment, sub-step 303b associates, based on the time point for the respective work event in the MES, a corresponding time point in one or more of the sensor signals SS1-SSm with the respective component D1-Dn. The corresponding time point thereby identifies one or more signal values for the respective component D1-Dn.

Step 303 may identify the signal values for the respective component in all of the sensor signals SS1-SSm or in one or more selected sensor signals for each component. In one embodiment, step 303 selects one or more sensor signals for the respective component by use of a predefined association between sensor signals and components, and identifies the signal values for the respective component among the selected sensor signal(s) associated with the respective component.

Figure 5:
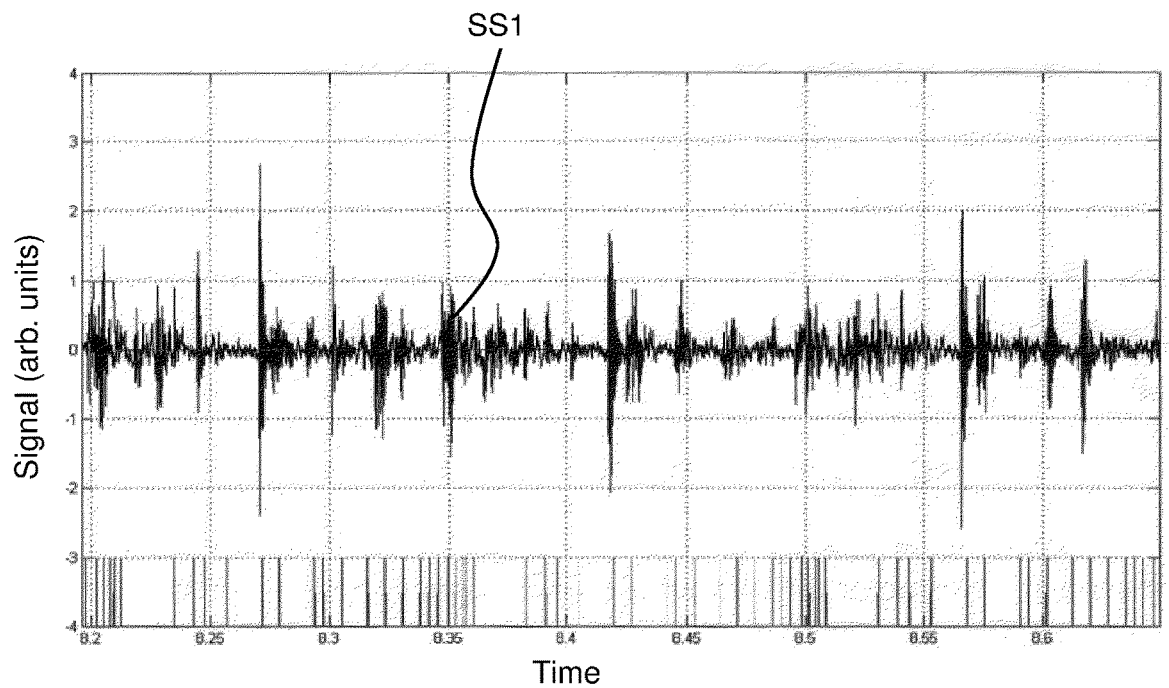
FIG. 5 is a composite graph of a measurement signal (top) and a model event signal (bottom).

Step 303 is further illustrated in the graph of FIG. 5. The top portion of FIG. 5 illustrates a sensor signal SS1 as a function of time, acquired by step 302, and the bottom portion illustrates a MES as a function of time, obtained by step 301. By arranging SS1 and MES in a common time frame, it is possible for step 303 to identify signal values in the SS1 that correspond to mechanical actions performed by a specific component. In one embodiment, step 303 may extract the signal value in SS1 that matches the timing of the respective work event in the MES. In another embodiment, step 303 may compute the signal value as a function of SS1 within a time window that matches the timing of a work event in the MES. For example, the signal value may be computed as measure of magnitude, e.g. average, sum, amplitude, RMS (root mean square), etc.

Step 304 evaluates the signal values that are identified by step 303 for condition assessment of the respective component. If step 304 identifies a current or future fault condition of one of the components, the method 300 may proceed to step 305 which may signal a need for maintenance of the component, e.g. via the feedback device 202.

It is realized that step 303 is capable of identifying signal values that correspond to time-spaced peaks in the sensor signals SS1-SSm. Such signal values, separately identified for each component, enables step 304 to apply any conventional analysis technique for identification of abrupt and incipient fault conditions of a specific component in the machine 10 and for RUL estimation of the individual components in the machine 10. An abrupt fault condition designates a failure or fault condition of a component that requires immediate attention by service personnel, and possibly the machine 10 to be shut down. An incipient fault condition designates an imperfection in the state or condition of the respective component so that a degraded or critical failure might (or might not) eventually be the expected result if corrective actions are not taken.

In one embodiment, depicted in FIG. 3, step 304 may comprise a sub-step 304a of computing one or more parameter values for the respective component, based on the signal values that are identified by step 303 for the respective component, and a sub-step 304b of analyzing the one or more parameter values for condition assessment of the respective component. In some embodiments, the one or more parameter values may comprise one or more of: variance, mean, peak area, energy, power, RMS, kurtosis, crest factor, skewness, spectral kurtosis, and standard deviation. Sub-step 304b may comprise comparing the one or more the parameter values to a respective threshold value. The threshold value many be set to detect an abrupt fault condition of the respective component. Alternatively or additionally, sub-step 304b may comprise trending and predicting the parameter value(s) over time for detection of an incipient fault condition of the respective component. As indicated in FIG. 3, the method 300 may repeat steps 302-304a to produce time-sequences of parameter values for analysis by step 304b, e.g. the trending and prediction. For example, step 304b may compare the parameter values hour-by-hour or day-by-day for detection of incipient fault conditions.

Figure 6A:
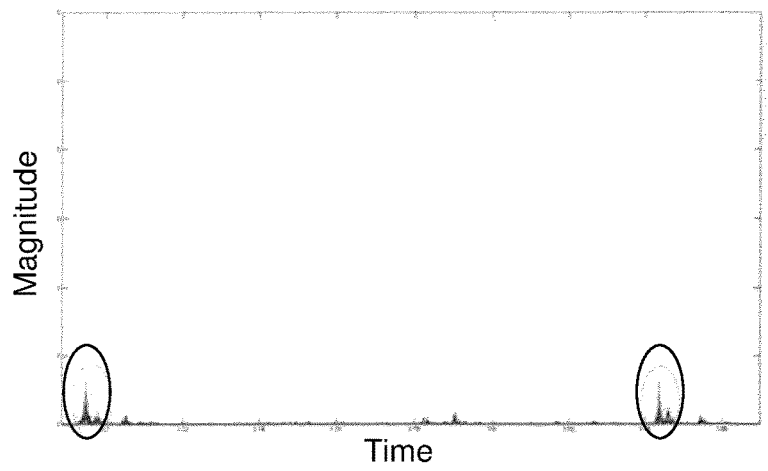
FIGS. 6A and 6B are graphs of signal magnitude as a function of time for a signal generated in a packaging machine comprising a healthy and faulty, respectively, mechanical component.
Figure 6B:
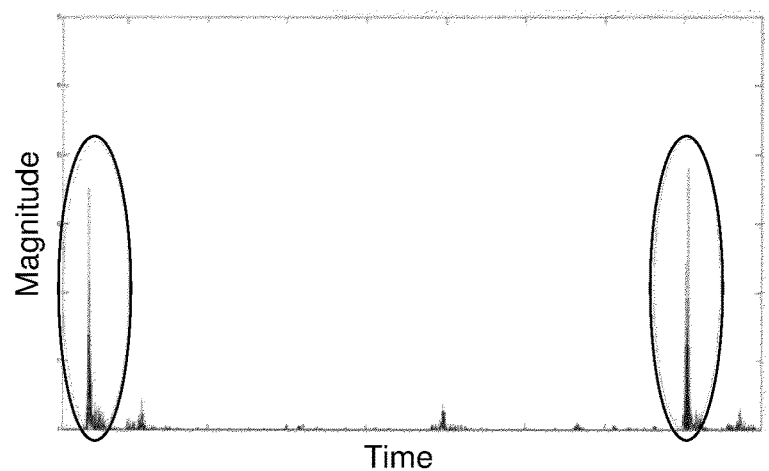

To exemplify vibrational changes that might occur when a component degrades, FIGS. 6A-6B illustrate a power signal representing amplitude squared of a vibration signal and comprising two time-spaced peaks (encircled) which are attributed to mechanical actions performed by a specific component. In FIG. 6A, the component is healthy. In FIG. 6B, the component is faulty and the magnitudes of the two peaks have increased significantly.

It is realized that the analysis in step 304 may be implemented with different level of complexity depending on the available sensor data and the desired output. The person skilled in the art may choose among a plethora of well-known analysis techniques for condition assessment, including but not limited to statistical methods, such as regression-based methods, Wiener processes, Gamma processes, Markovian-based methods, stochastic filtering-based methods, covariate-based hazard methods, Hidden Markov Model based methods, etc. It is also conceivable that step 304 involves machine learning (ML) or deep learning (DL) for detection of fault conditions and/or RUL estimation.

Reverting to FIG. 2A, the monitoring device 200 may comprise logic which is configured to perform the method 300 in FIG. 3. In the illustrated example, the logic comprises a set of modules or units 203-205. A signal matcher 203 is configured to perform steps 301, 302 and 303a to synchronize the sensor signals SS1-SSm with the MES. A signal value extractor 204 is configured to perform step 303b to extract, by use of the synchronized MES, one or more signal values for the respective component from the sensor signals SS1-SSm. An analyzer 205 is configured to perform step 304 to evaluate the signal values for condition assessment of the respective component.

Figure 2B:
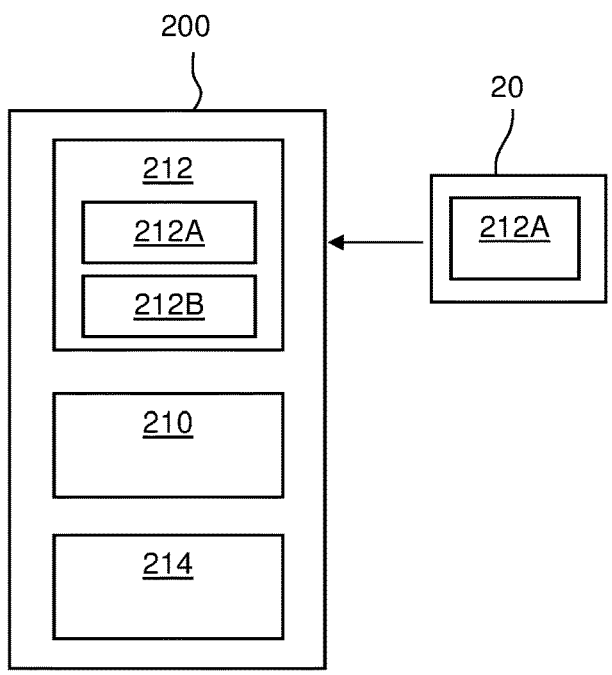

The respective module 203-205 may be implemented by hardware or a combination of software and hardware. In some embodiments, the monitoring device 200 is implemented on a software-controlled computing device, e.g. as shown in FIG. 2B. In the example of FIG. 2B, the monitoring device 200 comprises a processor 210 and computer memory 212. The processor 210 may e.g. include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 212A comprising computer instructions is stored in the memory 212 and executed by the processor 210 to perform the monitoring method as exemplified in the foregoing. The control program 212A may be supplied to the monitoring device 200 on a computer-readable medium 20, which may be a tangible (non-transitory) product (e.g. magnetic medium, optical disk, read-only memory, flash memory, etc) or a propagating signal. As indicated in FIG. 2B, the memory 212 may also store data 212B for use by the processor 210, e.g. the MES, the predefined reference signal SSr, etc. The monitoring device 200 further comprises a communication interface 214, which may include the signal interface 200a (FIG. 2A) as well as further signal interfaces for communication with the feedback device 202 and/or a control device of the machine 10 and/or the external memory device 201, if present.

The invention claimed is:

1. A method of monitoring a packaging machine which is operating to produce packages of liquid food, said method comprising:
   receiving measurement signals from a plurality of vibration sensors in the packaging machine,
   obtaining an event timing signal indicative of predefined work events of the packaging machine, wherein a respective predefined work event among the predefined work events corresponds to a mechanical action by a respective component in the packaging machine when operating to produce the packages, wherein the event timing signal associates a time point with the respective predefined work event,
   identifying, by use of the event timing signal and in the measurement signals, signal values associated with the respective component, wherein the identifying comprises:
      synchronizing the measurement signals with the event timing signal by retrieving a predefined reference signal which corresponds to one of the measurement signals and is matched to the event timing signal, and correlating the predefined reference signal with said one of the measurement signals to synchronize the measurement signals with the event timing signal, and
   evaluating the signal values for condition assessment of the respective component.

2. The method of claim 1, wherein the mechanical action results in a response in at least one of the measurement signals.

3. The method of claim 1, wherein the event timing signal is generated by executing a simulation of the packaging machine and its operation to produce of the packages.

4. The method of claim 1, wherein said identifying further comprises: associating, based on the time point for the respective predefined work event in the event timing signal, a corresponding time point in one or more of the measurement signals with the respective component, said corresponding time point identifying one or more of the signal values.

5. The method of claim 1, wherein at least a subset of the signal values corresponds to time-spaced peaks in the measurement signals.

6. The method of claim 1, wherein said evaluating comprises: computing one or more parameter values for the signal values, and analyzing the one or more parameter values for said condition assessment.

7. The method of claim 6, wherein the one or more parameter values comprises one or more of: variance, mean, peak area, energy, power, root-mean-square, kurtosis, crest factor, skewness, spectral kurtosis, or standard deviation.

8. The method of claim 6, wherein said analyzing comprises at least one of: comparing the one or more parameter values to a respective threshold value, and analyzing a change of the one or more parameter values over time.

9. The method of claim 1, further comprising: signaling a need for maintenance of the respective component responsive to said evaluating indicating a current or future fault condition of the respective component.

10. A non-transitory computer-readable medium comprising computer instructions which, when executed by a processor, cause the processor to perform the method of claim 1.

11. A monitoring device, comprising a signal interface configured to connect to a plurality of vibration sensors in a packaging machine, and processing logic configured to control the monitoring device to perform the method of claim 1.

12. A method of monitoring a packaging machine which is operating to produce packages of liquid food, said method comprising:
   receiving measurement signals from a plurality of vibration sensors in the packaging machine,
   obtaining an event timing signal indicative of predefined work events of the packaging machine, wherein a respective predefined work event among the predefined work events corresponds to a mechanical action by a respective component in the packaging machine when operating to produce the packages, wherein the event timing signal associates a time point with the respective predefined work event,
   identifying, by use of the event timing signal and in the measurement signals, signal values associated with the respective component, wherein the identifying comprises:
      synchronizing the measurement signals with the event timing signal by receiving, from a reference sensor in the packaging machine, a reference signal which is concurrent with the measurement signals and indicative of a predefined time point in the event timing signal, and comparing the reference signal to the measurement signals to allocate the predefined time point in the measurement signals to synchronize the measurement signals with the event timing signal, and
   evaluating the signal values for condition assessment of the respective component.

13. The method of claim 12, wherein the mechanical action results in a response in at least one of the measurement signals.

14. The method of claim 12, wherein the event timing signal is generated by executing a simulation of the packaging machine and its operation to produce of the packages.

15. The method of claim 12, wherein said identifying further comprises: associating, based on the time point for the respective predefined work event in the event timing signal, a corresponding time point in one or more of the measurement signals with the respective component, said corresponding time point identifying one or more of the signal values.

16. The method of claim 12, wherein at least a subset of the signal values corresponds to time-spaced peaks in the measurement signals.

17. The method of claim 12, wherein said evaluating comprises: computing one or more parameter values for the signal values, and analyzing the one or more parameter values for said condition assessment.

18. The method of claim 17, wherein the one or more parameter values comprises one or more of: variance, mean, peak area, energy, power, root-mean-square, kurtosis, crest factor, skewness, spectral kurtosis, or standard deviation.

19. The method of claim 17, wherein said analyzing comprises at least one of: comparing the one or more parameter values to a respective threshold value, and analyzing a change of the one or more parameter values over time.

20. The method of claim 12, further comprising: signaling a need for maintenance of the respective component responsive to said evaluating indicating a current or future fault condition of the respective component.

\* \* \* \* \*